United States Patent [19]
Huang

[11] Patent Number: 5,734,479
[45] Date of Patent: Mar. 31, 1998

[54] METHOD OF CALIBRATING AN IMAGE FOR REDUCING SHADING

[75] Inventor: Yin Chun Huang, Hsinchu, Taiwan

[73] Assignee: Umax Data Systems, Inc., Hsinchu, Taiwan

[21] Appl. No.: 692,741

[22] Filed: Aug. 6, 1996

[51] Int. Cl.$^6$ .................................................. H04N 1/401
[52] U.S. Cl. ........................... 358/274; 358/461; 358/406
[58] Field of Search ........................ 382/274; 358/461, 358/406, 483, 482, 446; 348/251

[56] References Cited

U.S. PATENT DOCUMENTS

| | | | |
|---|---|---|---|
| 4,821,099 | 4/1989 | Sakamoto | 358/461 |
| 5,151,796 | 9/1992 | Ito et al. | 358/461 |

*Primary Examiner*—Scott Rogers
*Attorney, Agent, or Firm*—Merchant Gould Smith Edell Welter & Schmidt

[57] ABSTRACT

An image system for reducing shading noise of a scanned image is disclosed. The present invention includes following steps: a required deviation of shading noise of an image is specified initially. A real deviation of the shading noise is then generated by measuring the image system. Next, a sampling constant (n) is generated by dividing the real deviation of the shading noise squared by the required deviation of the shading noise squared. A line of a calibration plate is scanned n times, and the pixels of the scanned lines of the calibration plate are averaged. Finally, the image is conventionally calibrated using the averaged scanned line as a reference.

10 Claims, 2 Drawing Sheets

METHOD OF CALIBRATING AN IMAGE FOR REDUCING SHADING

BACKGROUND OF THE INVENTION

1. Field of the Invention

The present invention relates to a method for calibrating an image system, and particularly to a method of calibrating an image system for reducing shading noise of a scanned image.

2. Description of the Prior Art

An image scanned by an image system, such as a scanner, stored in a computer, and then reproduced on a paper usually possesses some undesirable lines which are darker or brighter than the adjacent portion of the image, mining the image as a whole. In a worse case, a band of those undesirable darker or brighter lines can make the image unrecognizable. The aforementioned line or streak is often referred to as shading in image process terminology.

When comparing and qualifying two images each having single shading line, a comparison is simply made by comparing the brightness of these two shading lines. However, difficulty is arisen when comparing two or more images each having more than one shading line. For example, when an image having a lot of shading lines is compared with another image having fewer but severer shading lines, the comparison is almost based on the personal judgment which is different from one person to another person, and the comparison may be different even for the same person in a different place, with different surrounding lighting or at a different time. The problem mentioned above is caused primarily by the subjective judgment directly with the bare eyes.

An image system, like a scanner, typically possesses problems such as image defects or distortion of intensity owing to the photo-response non-uniformity of the light source, the mirror, the lens and the charge-coupled devices (CCDs), the aging of the system and the effect resulting from a dusty environment, which require a method to be compensated, or calibrated.

Unfortunately, noise in connection with a calibration process before or during scanning images is the primary and controllable cause of this shading effect among many other factors causing shading effect on an image in the image system. Thermal noise, non-linearity of a digital-to-analog converter, bit depth of an analog-to-digital converter and the digital-to-analog converter are just a few of the causes of the shading noise made during the calibration process. Further, extra or deficient calibration also makes shading effect worse.

A need has been arisen therefore for devising a method or a standard in image process realm for obtaining a quantitative comparison among the processed images, making the calibration adequate and automatic, and providing an objective standard for the comparison among images.

SUMMARY OF THE INVENTION

In accordance with the present invention, a method of calibrating an image system for reducing shading noise of a scanned image is disclosed. In one preferred embodiment, the method includes specifying a required deviation of shading noise for an image to be scanned by the image system, and measuring the image system to generate a real deviation of the shading noise. The method then includes determining a sampling constant (n), which is generated by dividing the real deviation of the shading noise squared by the required deviation of the shading noise squared. Then, the method proceeds to scanning a line of a calibration plate n times, and averaging the pixels of the scanned lines of the calibration plate. The final step includes calibrating the image using the averaged scanned line as a reference.

DESCRIPTION OF THE PREFERRED EMBODIMENT

In order to set up a method or a standard for judging an image having a shading problem, an approach is adapted to simplify the whole discussion into a case where the relationship between only two shading lines is explored, and thereafter the conclusion thus obtained is extended to the whole image with more than two shading lines. The reason why this approach is applied is that the whole situation is restricted and focused only on the brightness of the shading lines but not on the number of the lines.

Figure 1:
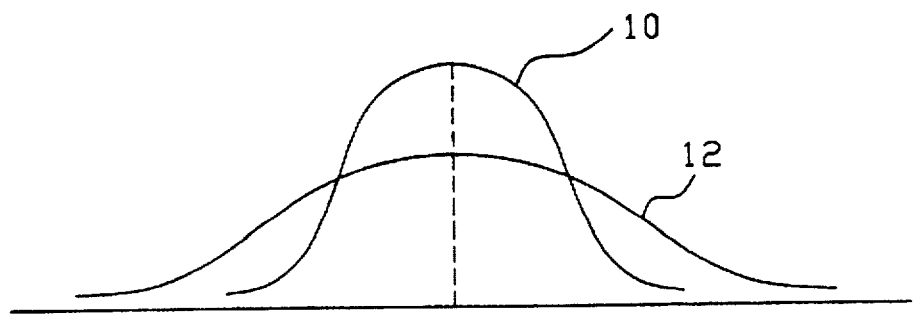
FIG. 1 shows two distribution curves having means $\mu_1$ and $\mu_2$ and deviations $\delta_1$ and $\delta_2$ respectively.

Basic probability and statistic theory are applied for deriving the mathematical relationship used in the present invention. A Gaussian distribution, also referred to as Normal distribution, is assumed, although other types of distribution can be used instead. FIG. 1 shows two distribution curves 10 and 12 having means $\mu_1$ and $\mu_2$ and deviations $\delta_1$ and $\delta_2$ respectively, where $\mu_1$ is equal to $\mu_2$, and $\delta_1$ is less than $\delta_2$. If a random variable Z is defined by $Z=(X-\mu)/\delta$ where X is the original random variable, then a normalized Gaussian distribution is obtained and designated as $n(Z; \mu, \delta)$ where $\mu$ is the mean and $\delta$ is the deviation. The aforementioned distribution $n(Z; \mu, \delta)$ has the following properties, that is, the curve is symmetrical about a vertical axis through the mean $\mu$, and the total area under the curve is equal to one. For two independent random variables $X_1$ and $X_2$ having the means $\mu_1$, $\mu_2$ and deviations $\delta_1$, $\delta_2$, the mean $\mu$ of their averaged random variable $(X_1+X_2)/2$ is:

$$\mu=(\mu_1+\mu_2)/2 \tag{1a}$$

and the deviation $\delta$ is:

$$\delta=(\delta_1^2+\delta_2^2)^{1/2}/2 \tag{1b}$$

However, the mean $\mu$ of their differential random variable $(X_1-X_2)$ is:

$$\mu=(\mu_1-\mu_2) \tag{1c}$$

and the deviation $\delta$ is:

$$\delta=(\delta_1^2+\delta_2^2)^{1/2} \tag{1d}$$

In a general notation for n random variables $X_1, X_2, \ldots X_n$ having means $\mu_1, \mu_2, \ldots \mu_n$ and deviations $\delta_1, \delta_2, \ldots \delta_n$, the mean $\mu$ of their averaged random variable $(X_1+X_2 \ldots +X_n)/n$ is:

$$\mu=(\mu_1+\mu_2 \ldots +\mu_n)/n \tag{2a}$$

and the deviation $\delta$ is:

$$\delta = (\delta_1^2 + \delta_2^2 \ldots + \delta_n^2)^{1/2}/n \quad (2b)$$

Returning back for considering the image having two shading lines, each is sampled n times by scanning. For each time of the n scannings or samplings, the same pixel of the line is scanned, and therefore random variables $X_1, X_2, \ldots$ and $X_n$ corresponding to each sampling are equal, supposed that the shading noise is a random noise and the number of the repeated samplings is enough. According to the equation (1b), the deviation $\delta_1$ of calibration and the deviation $\delta$ of noise have the following relationship:

$$\delta_1^2 = (\delta^2 + \delta^2 \ldots + \delta^2)/n^2 = n\delta^2/n^2 = \delta^2/n \quad (3)$$

or $$\delta_1 = \delta/\sqrt{n}$$

Employing equations (1d) and (3), the deviation $\delta_2$ of the differential random process between the two shading lines, the deviation $\delta_1$ of calibration and the deviation $\delta$ of noise for the differential random process between these two shading lines have the following relationship:

$$\delta_2^2 = \delta_1^2 + \delta_1^2 = 2\delta_1^2 \quad (4)$$

or $$\delta_2 = \sqrt{2}\,\delta_1 = \sqrt{2/n}\,\delta$$

After the relationship of the simplified case discussed above is clarified, it is straightforward to extend the deviation to the real case where the image has p shading lines, each having its mean $m_x$, where x is 1, 2, . . . p. The differential mean $d_1$ between line 1 and line 2 is $(m_2 - m_1)$, and the differential mean $d_2$ between line 3 and line 2 is $(m_3 - m_2)$, which are shown below:

$$d_1 = m_2 - m_1, \; d_2 = m_3 - m_2, \ldots d_{p-1} = m_p - m_{p-1}, \text{ and } d_p = m_1 - m_p$$

According to equation (2a), the mean μ of all the shading lines is:

$$\mu = (d_1 + d_2 \ldots + d_{p-1} + d_p)/p = 0$$

and the deviation δ of all the shading lines is:

$$\delta = \sqrt{2/n}\,d \quad (5)$$

where d is the deviation of noise and n is the number of samplings.

Figure 2:
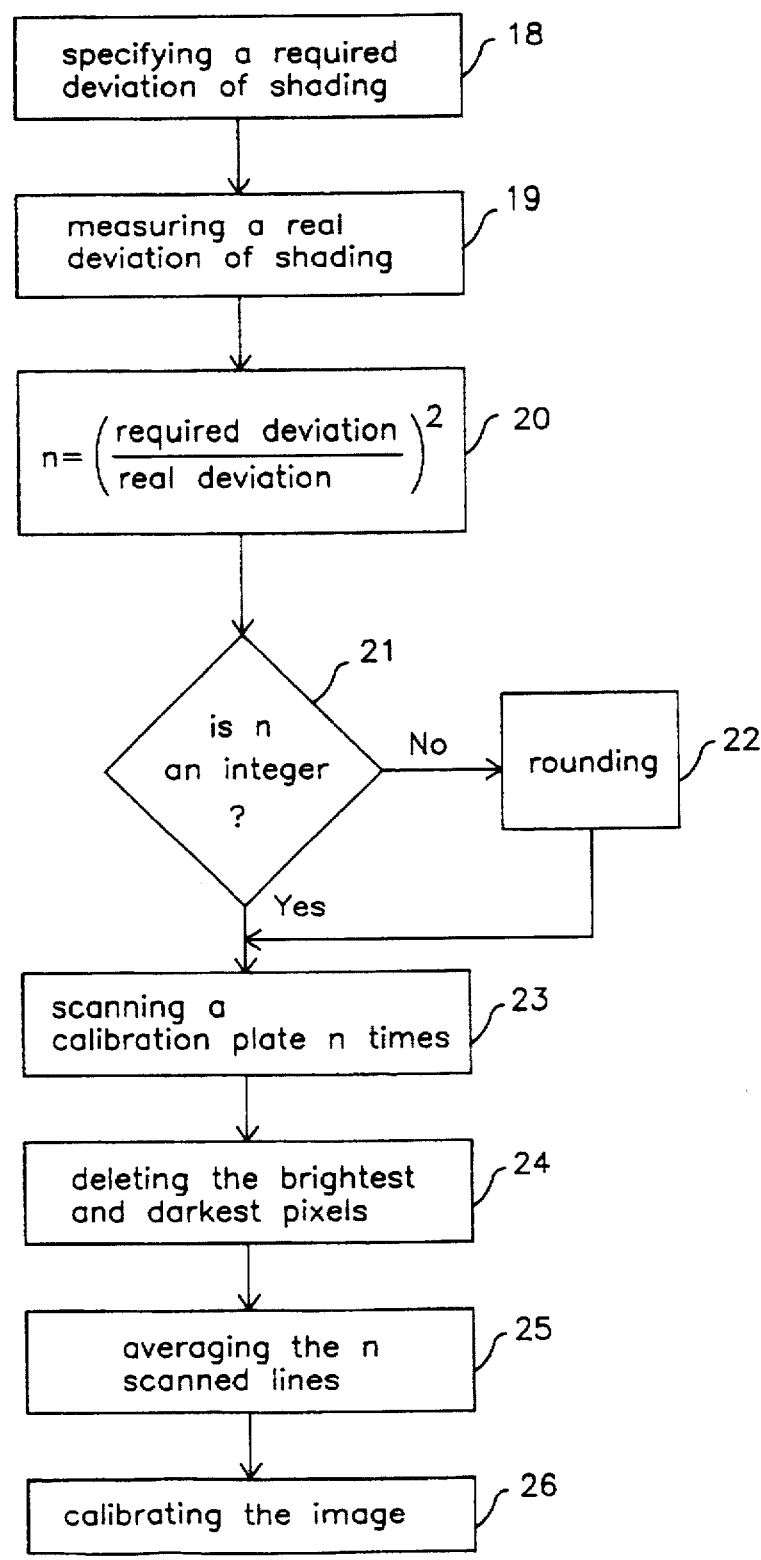
FIG. 2 shows a flow diagram demonstrating how an image having some shading lines thereon is scanned and calibrated according to the present invention.

Based on the discussion mentioned above., the present invention discloses a method of calibrating an image system, such as a scanner, for reducing shading noise embedded therein. FIG. 2 shows a flow diagram demonstrating how an image having some shading lines thereon is scanned and calibrated. Firstly, a required deviation of shading noise for an image is specified in step 18 before the image is scanned. Next, the real value of deviation of shading noise of the image system is measured in step 19. According to the equation 5, the measured deviation $\delta_1$ and the specified deviation $\delta_2$ have the following relationship, and the number n is generated by dividing the real deviation of the shading noise squared by the required deviation of the shading noise squared (step 20):

$$\delta_1/\delta_2 = \sqrt{2}d/\sqrt{2/n}d = \sqrt{n}$$

where n is the number of the samplings

For example, if the measured deviation $\delta_1$ is 2.4, and the specified deviation $\delta_2$ is 0.8, then $$\delta_1/\delta_2 = 2.4/0.8 = 3 = \sqrt{n},$$

and n is therefore equal to 9.

Figure 3:
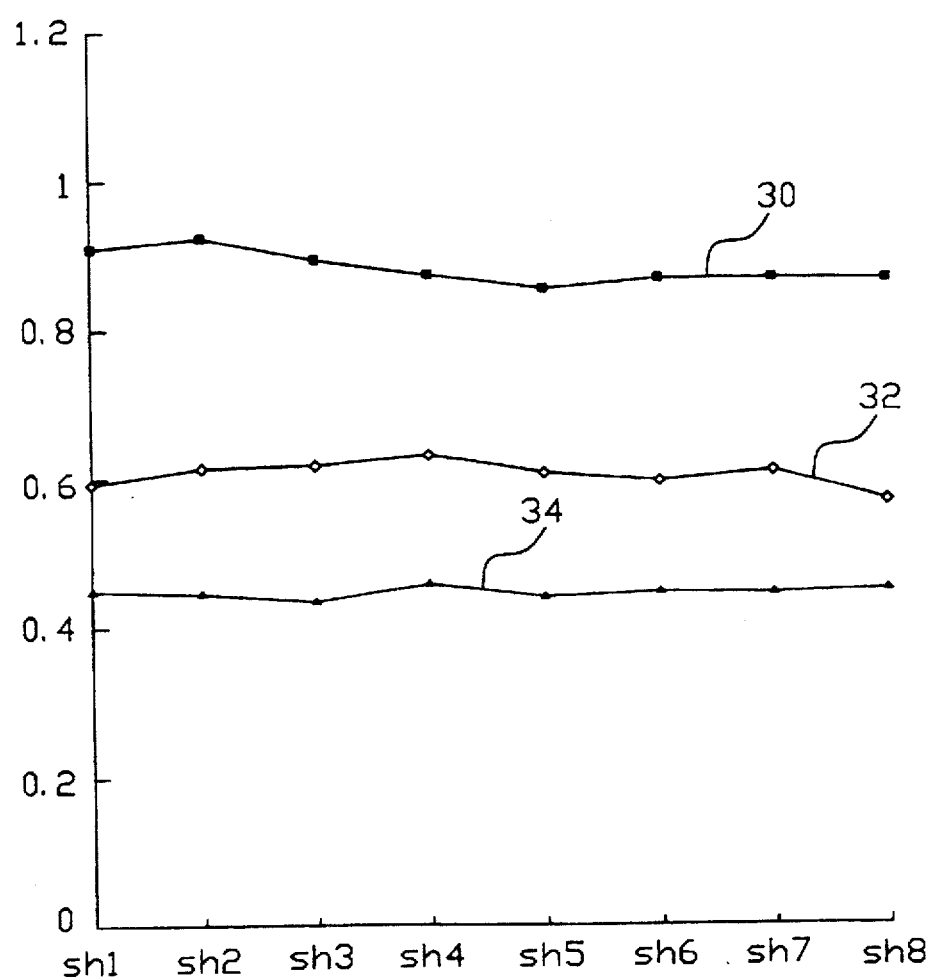
FIG. 3 shows three curves representing the respective experiments having 4, 8 and 16 samplings according to the present invention.

However, if the value of n, which is referred to as a sampling constant, is not an integer (step 21), the "No" branch is selected and a rounding step 22 is further performed to round the decimal portion to the nearest integer, or just truncate the decimal portion. Thereafter, a line of a calibration plate for the image system is scanned n times in step 23. Before further processing, the abnormally brightest and darkest pixels, if any, are usually deleted from the collected values of the scanned pixels in an optional step 24. Next, the pixels of the n scan lines are averaged in step 25, and then the averaged line is usually stored in memory. Finally, the image is conventionally scanned and calibrated in step 26 using the averaged scanned line obtained in the step 24 as a reference. A few experiments are conducted where 4, 8 and 16 samplings are performed for obtaining the shadings sh 1 to sh 8, as illustrated in TABLE 1. FIG. 3 correspondingly shows three curves representing the respective experiments having 4, 8 and 16 samplings.

TABLE 1

|           | 4 samplings | 8 samplings | 16 samplings |
|-----------|-------------|-------------|--------------|
| shading 1 | 0.911       | 0.593       | 0.449        |
| shading 2 | 0.925       | 0.614       | 0.445        |
| shading 3 | 0.895       | 0.617       | 0.434        |
| shading 4 | 0.875       | 0.631       | 0.459        |
| shading 5 | 0.855       | 0.607       | 0.440        |
| shading 6 | 0.841       | 0.596       | 0.447        |
| shading 7 | 0.841       | 0.609       | 0.445        |
| shading 8 | 0.839       | 0.568       | 0.450        |

Although specific embodiments have been illustrated and described it will be obvious to those skilled in the art that various modification may be made without departing from the spirit which is intended to be limited solely by the appended claims.

What is claimed is:

1. A method of calibrating an image system for reducing shading noise embedded therein, said method comprising the steps of:

specifying a required deviation of shading noise of an image;

measuring the image system to generate a real deviation of the shading noise;

determining a sampling constant (n), said sampling constant being generated by dividing said real deviation of the shading noise squared by said required deviation of the shading noise squared;

scanning a line of a calibration plate n times, wherein n is the sampling constant;

averaging a plurality of pixels of said scanned lines of the calibration plate; and calibrating the image using said averaged scanned line as a reference.

2. The method according to claim 1, further comprising a step of rounding the result of said sampling constant when said sampling constant is not an integer.

3. The method according to claim 2, wherein decimal portion of said sampling constant is rounded to a nearest integer.

4. The method according to claim 2, wherein decimal portion of said sampling constant is truncated.

5. The method according to claim 1, before averaging said scanned lines, further comprising a step of excluding a maximum value and a minimum value of the plurality of pixels from the scanned lines.

6. The method according to claim 1, wherein the averaged scanned line is further stored in storing means.

7. A method of calibrating an image system for reducing shading noise embedded therein, said method comprising the steps of:

specifying a required deviation of shading noise of an image;

measuring the image system to generate a real deviation of the shading noise;

determining a sampling constant (n), said sampling constant being generated by dividing said real deviation of the shading noise squared by said required deviation of the shading noise squared;

rounding the result of said sampling constant when said sampling constant is not an integer;

scanning a line of a calibration plate n times, wherein n is the sampling constant;

excluding a maximum value and a minimum value of the pixels from the scanned lines;

averaging a plurality of pixels of said scanned lines of the calibration plate; and calibrating the image using said averaged scanned line as a reference.

8. The method according to claim 7, wherein the averaged scanned line is further stored in storing means.

9. The method according to claim 7, wherein decimal portion of said sampling constant is rounded to a nearest integer.

10. The method according to claim 7, wherein decimal portion of said sampling constant is truncated.

* * * * *

UNITED STATES PATENT AND TRADEMARK OFFICE
CERTIFICATE OF CORRECTION

PATENT NO. : 5,734,479
DATED : MARCH 31, 1998
INVENTOR(S) : HUANG

It is certified that error appears in the above-identified patent and that said Letters Patent is hereby corrected as shown below:

Title page, [54] Title: insert —SYSTEM— after the word "IMAGE"
Column 1, line 1, insert —System— after the word "Image".
Col. 1, line 15: "mining" should read —ruining—

Col. 3, line 13: "(3)" should be moved down three lines.

Col. 3, line 24: "(4)" should be moved down three lines.

Col. 3, line 51: delete second occurrence of ","

Signed and Sealed this

Third Day of August, 1999

Attest:

Q. TODD DICKINSON

Attesting Officer

Acting Commissioner of Patents and Trademarks